Sept. 26, 1933.  B. L. LYTELL ET AL  1,927,987
PIPE JOINT
Filed Sept. 3, 1932  2 Sheets-Sheet 1

INVENTORS
Bernard L. Lytell
William D. Robinson
BY
ATTORNEYS

Sept. 26, 1933.     B. L. LYTELL ET AL     1,927,987
PIPE JOINT
Filed Sept. 3, 1932     2 Sheets-Sheet 2

INVENTORS
*Bernard L. Lytell*
*William D. Robinson*
BY

ATTORNEYS

Patented Sept. 26, 1933

1,927,987

UNITED STATES PATENT OFFICE 1,927,987

PIPE JOINT

Bernard L. Lytell, Detroit, and William D. Robinson, Grosse Pointe Farms, Mich., assignors to Detroit Hume Pipe Co., Detroit, Mich., a corporation of Michigan Application September 3, 1932. Serial No. 631,602

7 Claims. (Cl. 285—90)

The present invention relates to a novel expansible joint for connecting abutting ends of pipe sections of a type particularly adapted for forming continuous concrete pipes or conduits of a plurality of easily handled sections.

The primary object of the present invention is to provide means for securing the abutting ends or terminals of concrete pipe sections together to form a unitary expansible conduit which is strong and durable and capable of long reliable service.

Another object of the present invention is to provide means for uniting the adjacent ends of concrete pipe sections that are arranged in end to end relation to form a continuous or unbroken conduit capable of sustaining a head of fluid, such as water under pressure, without possibility of leakage taking place at the joints between the pipe sections.

Still another object of the present invention is to provide means for joining adjacent ends of pipe sections in a manner to form a continuous conduit capable of withstanding internal or external pressure without leakage and to permit relative lengthwise movement of the sections after they are united without destroying the efficiency of the sealing joints or cracking the pipe sections to permit leakage. Lack of provision for movement of the several sections relative to each other in such cases as when a non-expansible or non-contractible joint is provided between the pipe sections inevitably results in cracking of the concrete or destruction of the joint when expansion takes place and loss of contents as a result of leakage therethrough. Slip joints between concrete pipe sections are commonly used and are known to permit the required expansible movement of the sections when expansion takes place, but leakage of fluid takes place when the packing surrounding such slip joints becomes worn, damaged, or distorted as a result of constant temperature changes which cause intermittent expansion and contraction or of sagging of the conduit sections which changes the angular relation of their axes. The present joint overcomes both of the above cited undesirable features by providing a positive and expansible seal by means of which the pipe sections are secured together in a manner to permit relative movement of the sections longitudinally or a limited angular movement of the axes of the different sections relative to each other.

With the above and other ends in view the invention consists in matters hereinafter set forth and more particularly pointed out in the appended claims, reference being had to the accompanying drawings, in which Figure 1 is a fragmentary longitudinal cross section of two section ends joined in accordance with the present invention;

Like characters of reference are employed throughout to designate corresponding parts.

Figure 1:
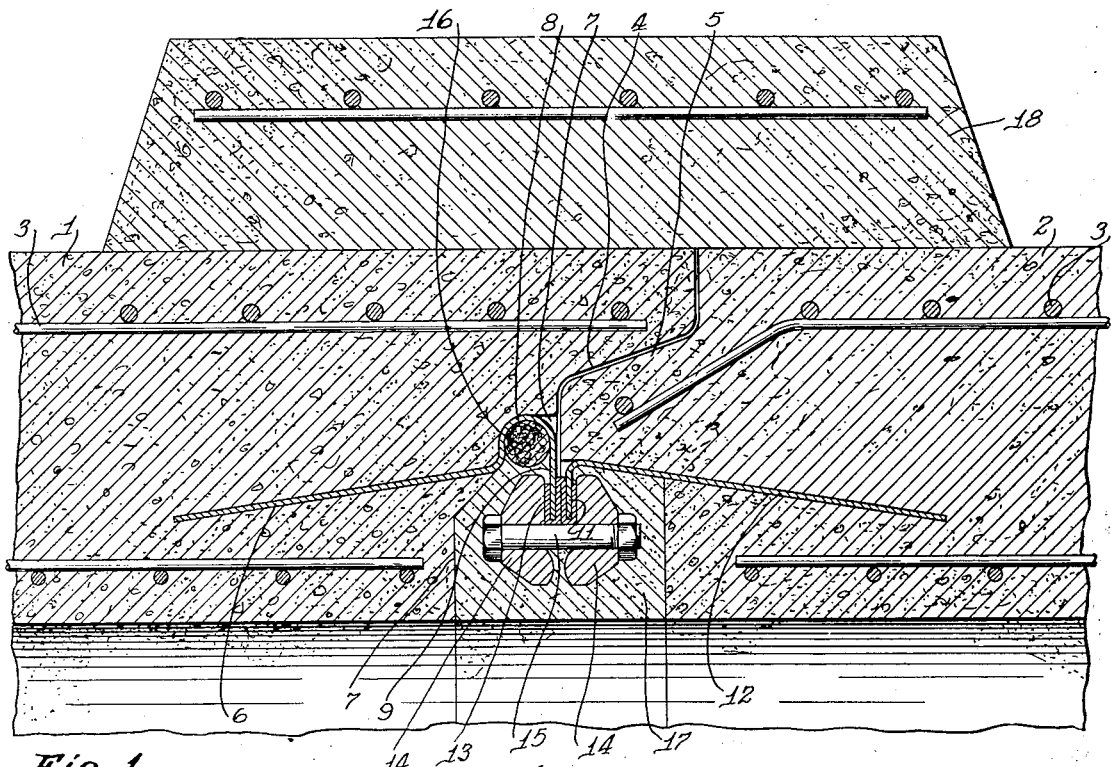

The numerals 1 and 2 designate portions of identical pipe sections formed of concrete and reinforced with steel 3 in a conventional manner. The pipe section 1 illustrates the bell end 4 and the section 2 illustrates the spigot end 5. The sections are aligned in end to end assembly to form a continuous conduit by inserting the spigot 5 of one section into the bell 4 of the next adjacent section, and the present invention provides means for joining the sections together in end to end relation and sealing the joint in a manner to permit movement of one section relative to the sections joined thereto without incurring leakage at the joint or straining and cracking the concrete forming the pipe sections.

A conical sleeve 6 is mounted in the bell end 4 of the pipe section 1 and projects into a recess 7 that is formed adjacent said bell end. The outer projecting end of the conical sleeve is bent or flared outwardly in a radial manner to form an inverted U-shaped flange, the rounded portion 8 of which extends into the recess 7, and the straight portion 9 extending inwardly in a radial plane at right angles to the axis of the pipe section.

The pipe section 2 is formed with a recess 10 concentric in the spigot 5 and an inturned flange 11 projects inwardly from the conical sleeve 12 that has its inner end imbedded in the concrete and its outer end projecting into the recess 11.

When the spigot 5 of one pipe is inserted within the bell end 4 of another pipe as illustrated in Fig. 1 the straight flange portion 9 of the sleeve 6 and the inturned flange 11 on the sleeve 12 are parallel to each other and slightly spaced apart. A double U-shaped gasket 13, preferably of rolled lead, is placed over the flange portion 9 and inturned flange 2 in the manner illustrated. Segmental clamping rings 14 are bolted together as at 15 and the gasket 13 is tightly clamped therebetween in a manner to secure the flange portion 9 and inturned flange 11 in the gasket.

After the clamping rings 14 have been bolted in place a jute packing 16 is placed in the rounded portion 8 of the conical sleeve 6 and the recesses 7 and 10 are filled with mortar or cement. The jute packing 16 prevents the mortar or cement 17 from entering the rounded portion 8 for a purpose which will become apparent as the description progresses. Surrounding the outside of the joint is a concrete collar 18 which is cast around the pipe sections after the same have been joined together.

Figure 2:
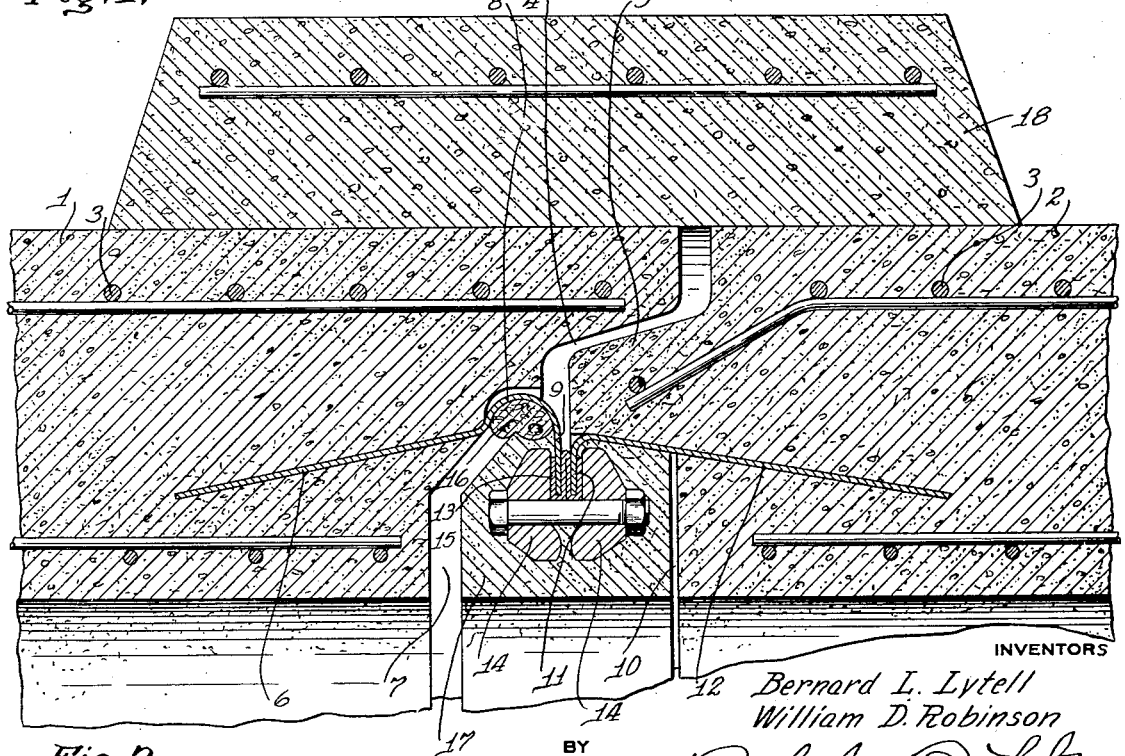
Fig. 2 is a fragmentary longitudinal cross section illustrating one stage of the expansible movement.
Figure 3:
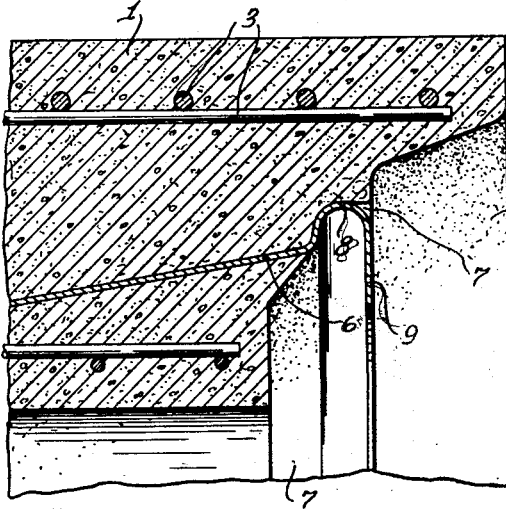
Fig. 3 is a fragmentary longitudinal cross section of the bell end of a pipe section.
Figure 4:
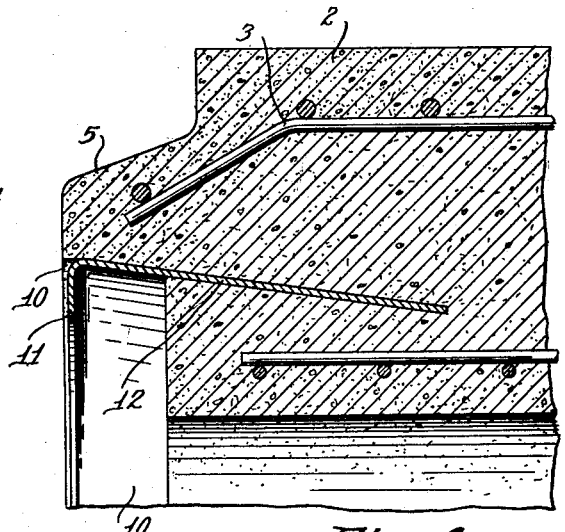
Fig. 4 is a fragmentary longitudinal cross section of the spigot end of a pipe section.
Figure 5:
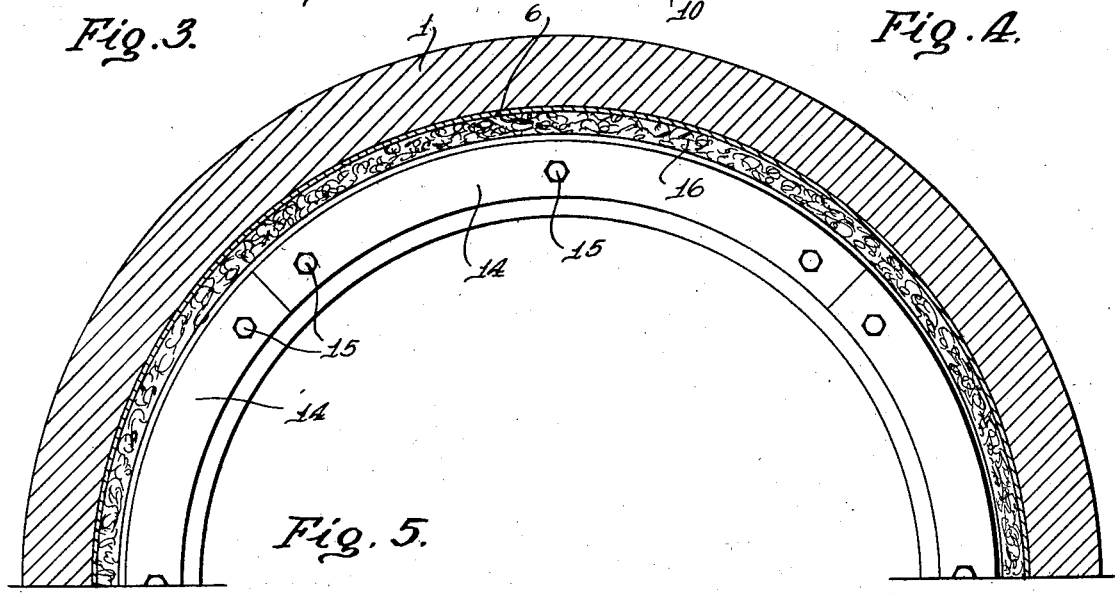
Fig. 5 is a fragmentary transverse cross section through one section adjacent the joint prior to the final sealing operation.
Figure 6:
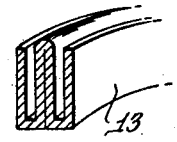
Fig. 6 is a cross section of a packing ring employed in the present joint.

The manner in which the present joint permits movement of one section relative to another may be readily understood by comparing Figs. 1 and 2 which serve to illustrate the manner in which the two sleeves 6 and 12 are tied immovably by the lead gasket 13 and the clamping rings 14. Movement of the section 1 away from section 2 causes the rounded portion 8 to become distorted so that the straight portion 9 may move relative to the pipe section 1 to which it is secured. The distortion of the rounded portion is permitted because of inability of the jute packing 16 to retain its shape when external pressure tending to move the sections exert pressure that tends to straighten the rounded portion 8. Insertion of the jute packing prior to the application of the mortar 17 prevents the mortar from entering the rounded portion 8 and thereby filling the same so that it would be impossible to bend the metal after the mortar or cement become hardened.

Although a specific embodiment of the present invention has been illustrated and described it is to be understood that various changes may be made in the details of construction without departing from the spirit of the invention, and such changes are contemplated.

What we claim is:

1. The combination with a pipe having a bell end, of a second pipe having a spigot end received therein, said pipe having a recess extending lengthwise and inwardly from said bell end, a uniting member having a portion permanently imbedded in said pipe and a portion received in said recess, said second pipe having a recess extending lengthwise and inwardly from said spigot end, a uniting member having a portion permanently imbedded in said second pipe and a portion received in said second named recess, said portions of said uniting members in said recesses being disposed in closely spaced relation by insertion of said spigot end within said bell end, and means received within said recesses for securing said last mentioned portions of said uniting members together, said last named means including a gasket having spaced channels receiving said last mentioned portions of said uniting members, and means for compressing said channels.

2. The combination with a pipe having a bell end, of a second pipe having a spigot end received therein, said pipe having an annular recess extending lengthwise and inwardly from said bell end, a uniting member having a portion permanently imbedded in said pipe and an annular portion disposed within said recess, said second pipe having an annular recess extending lengthwise and inwardly from said spigot end, a uniting member having a portion permanently imbedded in said spigot end and an annular portion disposed within said second named annular recess, said annular portions being supported in close proximity by insertion of said spigot end into said bell end, and means for securing said annular portions together, said means including a gasket having a pair of spaced channels receiving said annular portions, and clamping members disposed within said recesses and adapted to compress said gasket channels to tightly interpose said annular portions.

3. The combination with a pipe having a bell end, of a second pipe having a spigot end received therein, said pipe having an annular recess extending lengthwise and inwardly from said bell end, a uniting member having a portion permanently imbedded in said pipe and an annular portion disposed within said recess, said second pipe having an annular recess extending lengthwise and inwardly from said spigot end, a uniting member having a portion permanently imbedded in said spigot end and an annular portion disposed within said second annular recess, one of said securing members including a flexible portion between said imbedded portion and said annular portion, said annular portions being supported in close proximity by insertion of said spigot end into said bell end, means for securing said annular portions together, said means including a gasket having a pair of spaced channels receiving said annular portions, and clamping members disposed within said recesses and adapted to compress said gasket channels to tightly interpose said annular portions.

4. The combination with a pipe having a bell end and a pipe having a spigot end, of metallic uniting members imbedded in said bell and said spigot ends and having flanges held in abutting relation by insertion of said spigot end within said bell end, a gasket having separate channels separately receiving said flanges, and clamping members for compressing said channels to tightly interpose said flanges therein.

5. The combination with a pipe having a bell end and a pipe having a spigot end, of metallic uniting members permanently imbedded in said bell and spigot ends, said uniting members having transversely extending annular flanges disposed inwardly from said bell and spigot ends and adapted to be held in close proximity with one another by insertion of said spigot end within said bell end, a gasket having a pair of spaced channels separately receiving said flanges, and clamping members for compressing said gasket to tightly interpose said flanges between the side walls of said channels.

6. The combination with a pipe having a bell end and a pipe having a spigot end, of metallic uniting members imbedded in said bell and said spigot ends and having flanges held in abutting relation by insertion of said spigot end within said bell end, a gasket having separate channels separately receiving said flanges, clamping members for compressing said channels to tightly interpose said flanges therein, and a collar surrounding said bell and spigot ends.

7. The combination with a pipe having a bell end and a pipe having a spigot end, of metallic uniting members permanently imbedded in said bell and spigot ends, said uniting members having transversely extending annular flanges disposed inwardly from said bell and spigot ends and adapted to be held in close proximity with one another by insertion of said spigot end within said bell end, a gasket having a pair of spaced channels separately receiving said flanges, clamping members for compressing said gasket to tightly interpose said flanges between the side walls of said channels, and a collar surrounding said bell and spigot ends.

WILLIAM D. ROBINSON.
BERNARD L. LYTELL.